United States Patent

[11] 3,604,651

| [72] | Inventors | Tadao Ohno;<br>Michiaki Wada, both of Kanagawa, Japan |
|---|---|---|
| [21] | Appl. No. | 778,522 |
| [22] | Filed | Nov. 25, 1968 |
| [45] | Patented | Sept. 14, 1971 |
| [73] | Assignee | Fuji Photo Film Co., Ltd., Ashigara-<br>Kamigun<br>Kanagawa, Japan |
| [32] | Priority | Dec. 7, 1967 |
| [33] | | Japan |
| [31] | | 42/102964 |

[54] FILM TAKEUP CORE
3 Claims, 6 Drawing Figs.

[52] U.S. Cl. .................................................. 242/74
[51] Int. Cl. .................................................. B65h 75/28

[50] Field of Search ........................................... 242/74,
74.1, 74.2

[56] References Cited
UNITED STATES PATENTS
2,714,493   8/1955   Gramp .......................... 242/74
FOREIGN PATENTS
1,207,726   9/1959   France .......................... 242/74.1

Primary Examiner—George F. Mautz
Attorney—Sughrue, Rothwell, Mion, Zinn & Macpeak ABSTRACT: A film takeup core for a film magazine has a film end engaging groove on the periphery of the cylindrical body portion thereof. The groove has a protrusion on one inner surface for making a firm engagement with the film.

PATENTED SEP 14 1971 3,604,651

INVENTORS
TADAO OHNO
MICHIAKI WADA

BY Sughrue, Rothwell, Mion,
Zinn & Macpeak
ATTORNEYS

FILM TAKEUP CORE

BACKGROUND OF THE INVENTION

1. Field of the Invention

The present invention relates to a film takeup core, and in particular to an improvement in a film takeup core used in a motion picture film magazine or the like.

The film takeup core for mounting in a film magazine is generally so constructed that the film end is easily engaged therewith but is not easily removed therefrom.

2. Description of the Prior Art

Heretofore, film magazines have had a film takeup core similar to that shown in FIG. 1. One conventional film takeup core 1 has a T-shaped projection on the cutaway portion of the core periphery. The top surface 3 of the T-shaped projection 4 is in alignment with the periphery of the core 1. The film 5 is provided with an elongated opening 6 at an end portion thereof, which engages with said T-shaped projection 4 to couple the film to the core. When this type of film takeup core is used, the film 5 should be positioned perpendicular to the plane of rotation of the core 1 to allow insertion of the T-shaped projection 4 into the elongated opening 6 of the film 5 during engagement of the film with the core 1. This operation of film engaging is troublesome and takes a long time. If the T-shaped projection 4 is fixed to the core at the cut portion thereof, in a position rotated by 90°, the film 5 can engage with the projection without being rotated by 90°. But in this case, it is not practical, since the film 5 is then too easily removed from the core.

SUMMARY OF THE INVENTION

It is an object of the present invention to provide a film takeup core with which the film end is easily engaged and from which the film end is not easily removed, without the necessity of rotating the film during film engagement.

Figure 1:
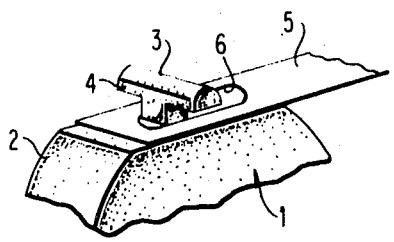
FIG. 1 is a perspective view of one example of a conventional film takeup core for a film magazine.
Figure 2:
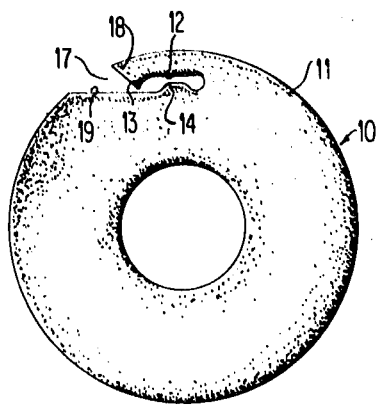
FIG. 2 is a side view of an embodiment of the film takeup core in accordance with the present invention.
Figure 4:
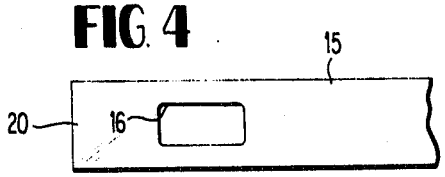
FIG. 4 is a plan view of the end of the film used with the film takeup core in accordance with the present invention.

Referring now to the drawings, the film takeup core in accordance with the present invention is used with a film 15 having an elongated longitudinal opening 16 at the end portion thereof as shown in FIG. 4, just like the conventional film takeup core which is described hereinabove. As best shown in FIG. 2, the film takeup core in one form in accordance with the present invention has an axially extending groove 12 for engaging film contacting the periphery 11 of the core body portion 10. The groove 12 for engaging film is provided with a surface projection 13 for preventing the film from being removed and a protrusion 14 for changing the film-advancing direction. The projection 13 for preventing the removal of film is located nearer the periphery of the core in the groove than the protrusion 14 for changing the film-advancing direction. The film guide-in or inlet portion 17 of the core 10 of the groove 12 is formed by smooth guide surfaces 18 and 19. Thus, the film is easily and smoothly inserted into the groove 12.

Since the takeup core in accordance with the present invention is constructed as described above, it has the following effect when the film end is engaged therewith.

Figure 5:
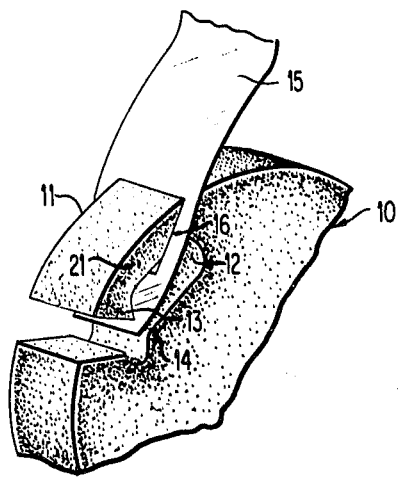
FIG. 5 is a perspective view of the film takeup core in accordance with the present invention with the film engaged therewith.

As best shown in FIG. 5, the film 15 having an elongated opening 16 at the end portion thereof engages the groove 12 such that the end portion 20 of the film 15 is inserted into the groove 12 and the elongated opening 16 engages the peripheral defined portion 21 of the core 10. The film end portion 20 during insertion into the groove 12 is guided along the protrusion 14 which acts to change the film-advancing direction. After the film end 20 passes the protrusion 14, the film end 20 is not easily removed out of the groove 12 because of the projection 13 for preventing the removal of film. The opening 16 is not necessarily elongated, but this is preferred.

According to a film takeup core, in accordance with the present invention, the film is not rotated when engaged with the groove of the core, but is easily engaged by merely pulling the film in the winding direction.

These effects of the present invention are particularly advantageous when the film takeup core is adapted to a film magazine or a magnetic tape magazine such as those wherein the film and the like are required not to be easily taken off the core after engagement.

Figure 3A:
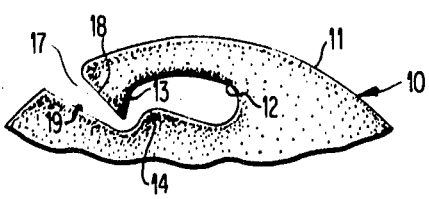
FIGS. 3A and 3B are side views of other embodiments of the film takeup core of the present invention.
Figure 3B:
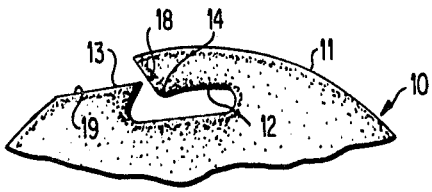

The groove as described above may be provided at two positions on the periphery of the core in a symmetrical relation with each other, as seen in FIG. 2. By providing such two grooves, the film can be engaged with the core from either direction, so that there is no need to make sure of the direction of the groove on the core, when engaging the film and the like. Various changes may be made in the position of projections 13 and 14, their configuration and the configuration of the slot or groove 12 as seen in FIGS. 3A and 3B where like numerals designate like parts.

What is claimed is:

1. A film takeup core for a film having a closed opening within one end thereof and adapted to be loaded in a magazine comprising: a cylindrical body member and an engaging portion provided on the periphery of said body member, said engaging portion being formed by at least one generally tangential groove of constant dimension opening up onto the core periphery, which engaging portion receives the film end opening when said film is pulled tangentially of said core in contact with the core periphery in a direction opposite said tangential groove, said groove having a first projection on one inner surface thereof for changing the film advancing direction during movement of said film opening onto said engaging portion.

2. The film takeup core as defined in claim 1 further including a second projection provided on the opposite inner surface of said groove for preventing the film removal.

3. The film takeup core as defined in claim 2 wherein said second projection is nearer the core periphery than said first projection.